United States Patent
Koehler et al.

(10) Patent No.: US 7,924,972 B2
(45) Date of Patent: *Apr. 12, 2011

(54) RECONSTRUCTION OF AN IMAGE OF A MOVING OBJECT FROM VOLUMETRIC DATA

(75) Inventors: Thomas Koehler, Norderstedt (DE); Michael Grass, Buchholz in der Norheide (DE); Michael Harald Kuhn, Hamburg (DE); Roland Proksa, Neu Wulmstorf (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 12/471,511

(22) Filed: May 26, 2009

(65) Prior Publication Data

US 2009/0232379 A1    Sep. 17, 2009

Related U.S. Application Data

(63) Continuation of application No. 10/564,572, filed as application No. PCT/IB2004/051150 on Jul. 7, 2004, now Pat. No. 7,545,903.

(30) Foreign Application Priority Data

Jul. 16, 2003  (EP) ..................................... 03102178

(51) Int. Cl.
*A61B 6/03* (2006.01)
(52) U.S. Cl. .................................. 378/8; 378/4; 382/294
(58) Field of Classification Search .................. 378/4, 8, 378/901; 382/131, 190, 294
See application file for complete search history.

(56) References Cited

U.S. PATENT DOCUMENTS

| | | | |
|---|---|---|---|
| 5,262,946 A | 11/1993 | Heuscher |
| 5,396,418 A | 3/1995 | Heuscher |
| 5,485,493 A | 1/1996 | Heuscher et al. |
| 5,544,212 A | 8/1996 | Heuscher |
| 5,751,782 A | 5/1998 | Yoshitome |
| 6,047,080 A | 4/2000 | Chen et al. |

(Continued)

FOREIGN PATENT DOCUMENTS

| EP | 1072224 A2 | 1/2001 |
|---|---|---|
| WO | 02103639 A2 | 12/2002 |

OTHER PUBLICATIONS

Chen, S.-Y., et al.; Kinematic and Deformation Analysis of 4-D Coronary Arterial Trees Reconstructed From Cine Angiograms; 2003; IEEE Trans. on Medical Imaging; 22(6)710-721.

(Continued)

*Primary Examiner* — Edward J Glick
*Assistant Examiner* — John M Corbett

(57) ABSTRACT

In the CT imaging of non-homogeneously moving objects such as the heart or the coronary vessel tree, there is a problem that different parts of the objects are at rest at different points in time. Thus, a gated reconstruction with a globally selected time point does not yield a sharp image of such objects. According to the present invention, a motion of the object is estimated, describing the motion of selected regions of these objects. Then, on the basis of the estimated motion, time points are determined, where these areas have minimal motion. Then, an image is reconstructed, wherein the data from which the respective regions are reconstructed, correspond to the respective time points, where the regions have minimal motion. Due to this, an improved image quality may be provided.

20 Claims, 4 Drawing Sheets

U.S. PATENT DOCUMENTS

| | | | |
|---|---|---|---|
| 6,154,516 | A | 11/2000 | Heuscher et al. |
| 6,353,653 | B1 | 3/2002 | Edic |
| 6,381,487 | B1 | 4/2002 | Flohr et al. |
| 6,385,285 | B1 | 5/2002 | Vaillant et al. |
| 6,396,897 | B1 | 5/2002 | Ebrahimifard et al. |
| 6,426,990 | B1 | 7/2002 | Cesmeli |
| 6,529,575 | B1 | 3/2003 | Hsieh |
| 7,545,903 | B2 * | 6/2009 | Kohler et al. ............ 378/8 |
| 2002/0032376 | A1 | 3/2002 | Miyazaki et al. |
| 2004/0175024 | A1 * | 9/2004 | Rasche et al. ............ 382/128 |

OTHER PUBLICATIONS

Grangeat, P., et al.; Theoretical Framework for a dynamic cone-beam reconstruction algorithm based on a dynamic particle model; 2002; Physics in Medicine and Biology; 47:2611-2625.

Grass, M., et al.; A projection-based method for motion-compensated noise suppression; 1998; Philips J. Res.; 51:283-298.

Kachelriess, M., et al.; ECG-correlated image reconstruction from subsecond multi-slice spiral CT scans of the heart; 2000; Med. Phys.; 27(8)1881-1902.

Kalender, W. A.; Computed Tomography:Fundamentals, System Technology, Image Quality, Applications; 2000; Publics MCD Verlag; pp. 78-81.

Schaeffter, T., et al.; Motion Compensated Projection Reconstruction; 1999; MRM; 41:954-963.

Taguchi, K, et al.; High temporal resolution for multislice helical computed tomography; 2000; Med. Phys.; 27(5) 861-872.

Weruaga, L., et al.; Estimating Volumetric Motion in Human Thorax with Parametric Matching Constraints; 2003; IEEE Trans. on Medical Imaging; 22(6)766-772.

* cited by examiner

RECONSTRUCTION OF AN IMAGE OF A MOVING OBJECT FROM VOLUMETRIC DATA

CROSS REFERENCE TO RELATED APPLICATIONS

This application is a continuation of utility patent application Ser. No. 10/564,572, confirmation number 2143, filed May 8, 2006, which claims priority to PCT application Ser. No. PCT/IB04/051150, filed Jul. 7, 2004, which claims priority to European application serial number 03 102 178.5, filed Jul. 16, 2003, which are incorporated herein in their entirety by reference.

The present invention relates to the field of digital imaging and in particular to three-dimensional art of diagnostic computed tomography (CT) imaging. In particular, the present invention relates to a method of reconstructing an image of an object from volumetric data of the object, to an image processing device and to a machine readable medium, having instructions recorded thereon.

In typical spiral or helical CT scanning, an x-ray source or tube emits a beam of radiation as it rotates continuously around an examination region, through which a patient support table moves at a constant linear velocity. Detectors positioned across the examination region from the x-ray tube, convert x-rays which traverse the patient into corresponding electronic data. The collected data effectively represent a helical path of constant pitch through the patient. The helical data, which may also be referred to as volumetric data, are reconstructed into a volumetric image representation, typically a series of consecutive thin slice images of a region of interest of the patient. Examples of such methods and apparatus are, for example, described in U.S. Pat. Nos. 5,544,212; 5,485,493; 5,262,946; and 5,396,418, which are hereby incorporated by reference.

Furthermore, there are a number of methods aimed at reconstructing cardiac images with reduced motion artifacts. For example: a prospective electrocardiogram (ECG) gated method with axial slice CT acquisition may be used to reconstruct cardiac images, such as, for example, described in U.S. Pat. No. 5,751,782. A retrospective ECG-gate CT data acquisition and reconstruction technique using spiral CT is also known, as indicated, for example, in U.S. Pat. No. 6,154,516.

A particular problem in the CT of moving objects such as the heart or the coronary artery system is that different parts of these objects are at rest at different time points. Thus, a gated reconstruction with globally selected phase points for the moving or deforming objects are always a compromise, since, as described above, it may happen that areas of the object are with minimal motion, whereas other areas of the object have significant motion.

It is an object of the present invention to provide for an improved visualization of moving objects, such as, for example, the heart or the coronary artery section or parts of a coronary artery.

According to an aspect an image of an object is reconstructed from volumetric data of the object. The volumetric data include a plurality of projections corresponding to a plurality of time points. According to the method of this exemplary embodiment, a motion of the object is estimated. Then, first time points are determined, where the motion of the object is minimal on the basis of the estimated motion and projections are selected from the plurality of projections on the basis of these first time points. Then, the image is reconstructed from the projections selected from the plurality of projections.

Advantageously, due to the fact that the image is reconstructed from projections where the motion of the object is minimal, an improved image quality may be provided, where moving objects such as the heart may be reconstructed without blurring. Furthermore, due to the estimation of the motion, an automatic optimization of the image quality may be provided, since the selected projections correspond to time points with minimal motion in the object.

According to another exemplary embodiment the volumetric data correspond to cardiac CT data and simultaneously measured electrocardiogram (ECG) data or photoplethysmographic (PPG) data. According to this exemplary embodiment of the present invention, a reconstruction of a series of low resolution 3D images of the heart is performed, which cover the cardiac cycle, i.e. a series with different phase points. Then, the determination of the motion fields is performed for the series of low resolution 3D images. Such motion fields then describe the cyclic motion of the heart with a low spatial resolution. Then, time periods are determined from the motion fields at which selected areas of the heart are addressed. These time points are collected in a temporal map, which then contains optimal time points for each of the selected regions of the heart. Then, on the basis of this high temporal map, a high resolution image is reconstructed from projections corresponding to the time points of minimal motion in the high temporal map.

Due to the fact that the motion detection operates on low resolution images, a very efficient method is provided. Advantageously, this may allow to keep computational costs moderate.

According to another exemplary embodiment the missing time points in the high resolution map are determined by interpolation. Furthermore, according to this exemplary embodiment of the present invention, a reconstruction of the high resolution image is performed, such that data gathered at a certain time point are used to reconstruct a first region of the heart, whereas data corresponding to another time point are used for reconstructing a second region of the heart.

In this context is should be noted that the term "time point" is not limited to "a point in time", but may also relate to phase points, relating, for example, to the cyclic motion of the heart or to time periods and a corresponding temporal window around each phase point.

According to another exemplary embodiment the volumetric data correspond to the coronary artery region and simultaneously measured electrocardiogram data. Furthermore, according to this exemplary embodiment of the present invention, the image is reconstructed on the basis of an iterative reconstruction optimization.

Due to the fact that for the iterative reconstruction optimization, projections are used where there is only minimal motion in the coronary artery region, the reconstructed image may have an improved image quality.

According to another exemplary embodiment the selection of the projections from the plurality of projections corresponds to a setting of a gating window. A variation of the gating window causes a reconstruction of a new image on the basis of the iterative reconstruction optimization in real-time. This image may then be displayed on a display. According to an aspect of this exemplary embodiment of the present invention, a gating window adaptation with respect to width and position is performed based on the motion fields, such that, e.g. each of the coronary vessels having different motion patterns throughout the cardiac cycle is reconstructed from data corresponding to its own individual point in time (or phase point of the ECG signal), where its speed of motion is minimal. This means that, according to this exemplary embodiment of the present invention, the reconstruction window or gating window is shifted to the minimum motion (rest) phase for a particular vessel section of interest, in order to achieve optimum image quality.

According to another exemplary the variation of the gating window is performed on the basis of the motion fields or the magnitude of the motion, such that the gating window is automatically set to time points, where there is minimal motion in the object, such that the new image is automatically optimized.

Advantageously, according to this exemplary embodiment of the present invention, an automatic optimization of the image quality may be provided.

According to another exemplary the variation of the gating window is based on an input by, for example, an operator, such that a real-time interactive optimization of the image is provided. In other words, an image determined on a first gating window may be displayed to a user. Then, this window may be manipulated by the user in terms of position and width, using, for example, standard level or window mechanisms. Then, according to an aspect of this exemplary embodiment of the present invention, the reconstruction result is immediately updated, such that the user may interactively control the optimization process.

According to another exemplary embodiment a segmentation of the coronary vessel tree is performed from the volumetric data, allowing for an image displaying the coronary vessel tree without disturbing neighboring areas.

According to an exemplary embodiment an image processing device is provided, allowing for an improved imaging of moving or deforming objects on the basis of a determination of time points with a minimal motion and the reconstruction of the image on the basis of projections of the volumetric data corresponding to these time points.

Further exemplary embodiments of the image processing device are also discussed.

According to another exemplary embodiment of the present invention, a machine readable medium is provided, having instructions recorded thereon, configured to instruct a computer to perform the method according to the present invention. The instructions recorded on the machine readable medium may be written in any suitable programming language, for example C++. The machine readable medium may, for example, be a CD-ROM. Instead of being stored on a machine readable medium, the instructions (or the computer program) configured to instruct a computer to perform the method of the present invention may also be available from a network, such as the World Wide Web, from which they may be downloaded to image processing units, processors or any suitable computers.

It may be seen as the gist of an exemplary embodiment of the present invention that a magnitude of the motion of the object of interest is determined. Then, on the basis of the motion magnitude of the object (or an absolute amount of the motion), time points or phase points are determined at which the motion of the object is minimal, or where the object or an area thereof is at rest. Then, according to an aspect of the present invention, projections are used to reconstruct the image of the object, corresponding to the determined time points with minimal or no motion. Thus, according to an aspect of the present invention, a first region of the object may be determined from projections corresponding to a first time point, whereas a second region of the object of interest may be reconstructed from projections corresponding to a second time point. In other words, for reconstructing an image of, for example, the heart, data corresponding to different points in time may be used to reconstruct an image. The present invention may, in particular, be advantageous in conjunction with gated cardiac CT reconstruction or coronary artery imaging in multi-slice CT.

These and other aspects of the present invention will become apparent from and elucidated with reference to the embodiments described hereinafter.

Exemplary embodiments of the present invention will be described in the following with reference to the following drawings.

Figure 1:
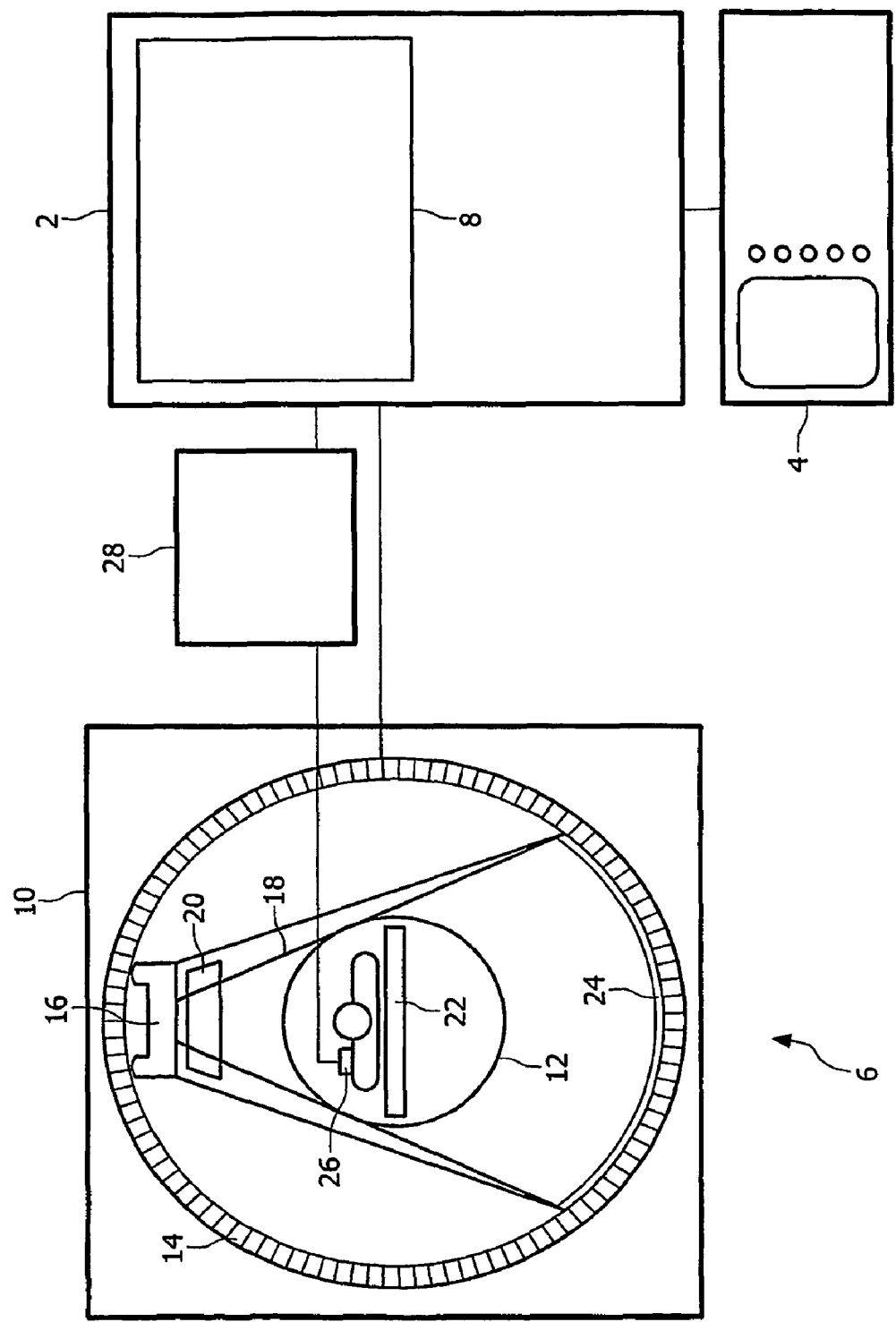
FIG. 1 shows an exemplary embodiment of an image processing device connected to a CT-scanner according to the present invention.

FIG. 1 shows a schematic simplified representation of an image processing device 2 connected to an input/output unit 4 and to a CT-scanner 6, according to an exemplary embodiment of the present invention. The image processing device 2 comprises a calculation unit 8, such as a computer including a processor and a memory. The computer tomographic CT-scanner 6 comprises a stationary gantry 10 which defines an examination region 12. Reference character 14 designates a rotating gantry, which is mounted to the stationary gantry 10. A source of penetrating radiation 16 such as an x-ray tube is arranged on the rotating gantry 14 for rotation therewith. The radiation source 16 may be collimated to produce a cone or fan-shaped beam of radiation 18, which passes through the examination region 12 during rotation of the rotating gantry 14.

Furthermore, there is provided a collimator and shutter system 20 for shaping the beam of radiation 18 and for selectively gating the beam 18 on and off. Also, the radiation beam 18 may be gated on and off by means of electronically switching the source of radiation 16. Reference character 22 designates an object support such as a patient couch, supporting the object to be scanned such that a region of interest of the object is at least partially within the examination region 12 of the CT-scanner 6. On the rotating gantry 14, on a position opposite to the source of radiation 16, there is provided a radiation detector 24. The radiation detector 24 is arranged such that it detects a substantial amount of the beam of radiation 18 emitted by the radiation source 16 after passing through the object in the examination region 12. Preferably, the radiation detector is a 2-dimensional detector array. Furthermore, the radiation detector 24 is mounted to the rotating gantry 14 for rotation therewith such that the radiation detector 24 rotates together with the radiation source 16 around the examination region 12. It is also possible to use a third generation scanner system, where the detector is focused on the tube.

During rotation of the rotating gantry 14 around the examination region 12, the object support 22 holding the object of interest thereon is translated along a central horizontal axis of the examination region 12. Due to this, the radiation source 16 and the radiation detector 24 follow a helical path relative to the object of interest. Optionally, in an alternative embodiment, the support 22 may remain stationary while the stationary gantry 10 is arranged such that it is translated or otherwise moved relative to the object of interest such that the source of radiation 16 and the radiation detector 24 are displaced along the helical path relative to the object of interest during a scan.

During a scan, the radiation detector 24 is sampled at predetermined time intervals. The sampling results read from the radiation detection 24 are electrical signals, i.e. electrical data, which are referred to as projection in the following. A whole dataset of a whole scan of an object of interest therefore consists of a plurality of projections where the number of the projections corresponds to the time interval with which the radiation detector 24 is sampled. A plurality of projections together may also be referred to as volumetric data. Also, according to an aspect of the present invention, the volumetric data may also comprise electrocardiogram data.

The plurality of projections are transmitted to the image processing device 2, where they are read by means of the calculation unit 8. On the basis of the plurality of projections, the calculation unit 8 reconstructs slice images of the object of interest along a plane perpendicular to the central horizontal axis of the examination region 12. Instead of generating slice images, the calculation unit 8 may also be constructed to determine 3-dimensional images or animated representations where, for example, individual images are put together such that an animated sequence of images showing, for example, the periodic movement of the human heart is generated. The images can be out-put via the input/output unit 4. Furthermore, the input/output unit 4 allows an operator to manually control parameters of the scan in the CT-scanner 6 and the image processing device 2.

Reference character 26 in FIG. 1 designates a sensor attached to the thorax of a patient to be examined. The sensor 26 is connected to an electrocardiogram (ECG) 28 which is connected to the image processing device 2. Alternatively, instead of the ECG, other corresponding devices may be provided, such as suitable acoustic sensors or optical sensors.

The CT scanner may be a high temporal resolution cardiac CT scanner, a CT scanner generally suitable for cardiac scans, and/or a multi-slice CT (MSCT).

FIRST EXEMPLARY EMBODIMENT

This first exemplary embodiment of the method according to the present invention will be described with reference to cardiac CT, but may also be applied to other moving objects.

As described with reference to FIG. 1, the CT data, namely the volumetric data, are acquired together with a simultaneously measured electrocardiogram (ECG) or a simultaneously measured photoplethysmograph (PPG). The simultaneously measured ECG or PPG may be used as a reference to select projections which correspond to a certain heart phase. Typically, the aim of such gating is to select the end-systolic or the end-diastolic phase of the heart, in order to minimize motion artifacts. This selection of the heart phase may be controlled by the so-called phase point.

In case of a PPG acquisition, a rough estimation of reference points or phase points may be performed in each cardiac cycle with a simple peak detection of the PPG signal. Advantageously, a filtering of the PPG signal may be performed before detection. Furthermore, the accuracy of the detection may be further improved by a cross-correlation.

Since the activation of the heart is not performed instantaneously, the period of rest may have a significant spatial variation. According to an aspect of the present invention, it was observed that the spatial variations are relatively smooth, such that an optimal phase point may be determined by using low resolution images. This will now be described in further detail with reference to FIG. 2.

Figure 2:
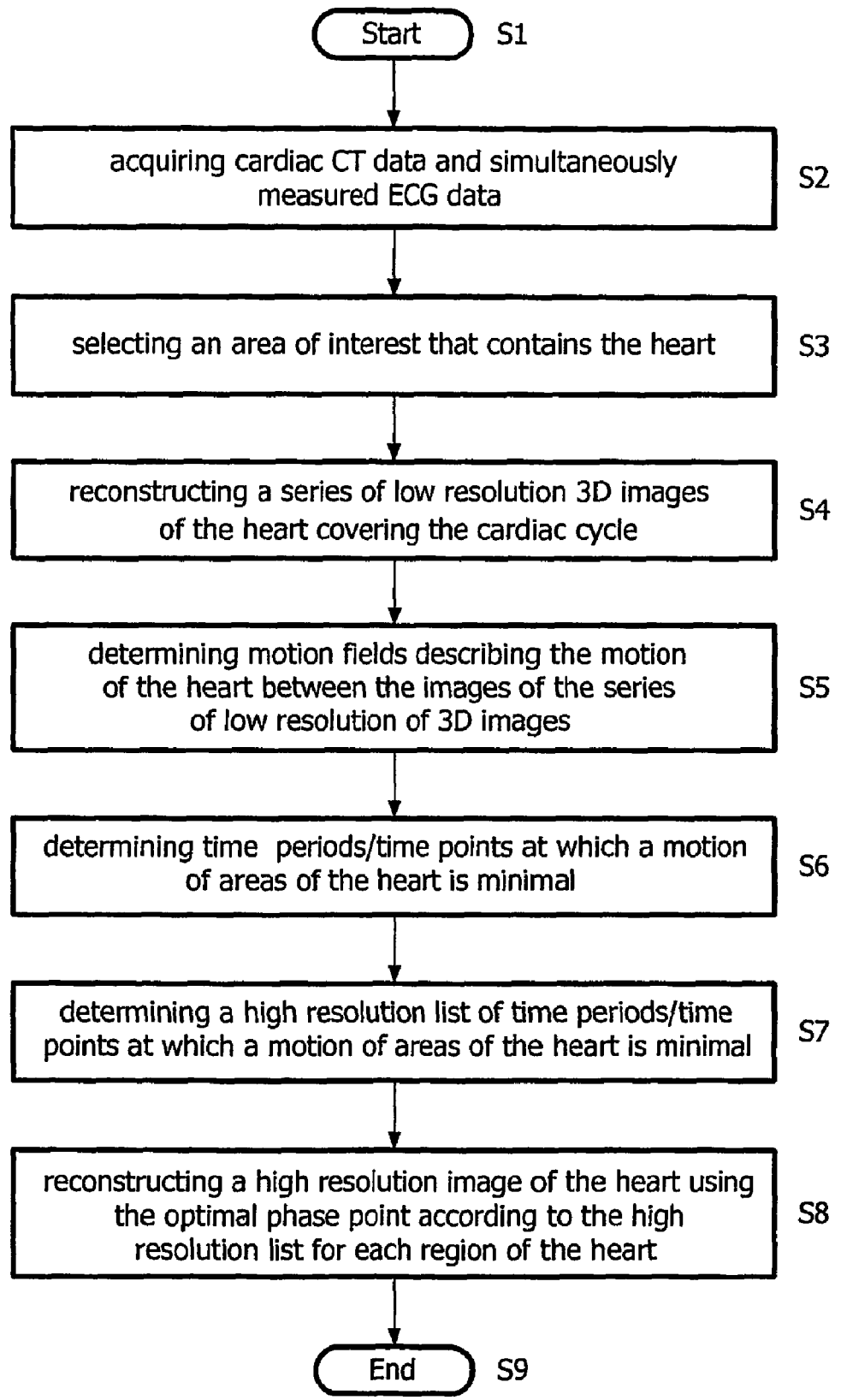
FIG. 2 is a flow-chart of a first exemplary embodiment of a method of operating the device of FIG. 1.

FIG. 2 shows a flow-chart of the first exemplary embodiment of a method for operating the image processing device 2 of FIG. 1.

After the start in step S1 of FIG. 2, the method continues to step S2, where cardiac CT data and simultaneously measured ECG data or PPG data, or any other data representing the cardiac cycle, such as, e.g., data acquired by a mobile heart rate monitor usually used for, e.g., monitoring the heart rate during physical training, such as running, cycling or walking, are acquired. After that, reference points may be selected on the basis of the ECG data or PPG data, which define the begin and the end of a cardiac cycle. Then, the method continues to step S3, where an area of interest is selected from the CT data, which contains the heart. Then, in the subsequent step S4, a series of low resolution 3D images of the heart is reconstructed. The low resolution 3D images are selected such that they cover the cardiac cycle. According to an aspect of the present invention, they may cover the whole cardiac cycle. The resolution of the low resolution 3D images may be only 25%, or even as low as 6% of the resolution of the high resolution image finally reconstructed in step S8. The low resolution 3D images, each having a different phase point, may be reconstructed, as described in W. Kalender, "Computed Tomography: Fundamentals, System Technology, Image Quality, Applications" Publics MCD Verlag, Munich, 2000, which is hereby incorporated by reference.

Then, the method continues to step S5, where motion fields are determined, which describe the inter-image motion of the heart. In other words, one or a plurality of motion fields may be determined, describing the motion of the heart between the images of the series of low resolution images determined in step S4. These motion fields describe the cyclic motion of the heart with a low spatial resolution. The motion fields may be determined as described in T. Schäffter et al., "Motion compensated projection reconstruction" Magn. Reson. Imaging, 41:954-963, 1999, which is hereby incorporated by reference. The magnitude of the motion may also be estimated from a mean absolute difference (MAD) between two templates (volume regions in these two templates) or any other suitable similarity measure.

As an optional step, the reference points or phase points within each cardiac cycle may be optimized on the basis of the motion fields.

Then, the motion fields determined in step S5 are used in step S6 to determine time points or time periods at which a motion of areas of the heart is minimal or where these areas are at rest. As already mentioned above, time points are not limited to "point in time", but should be understood as relating to time points, time periods and/or phase points of the movement. This may, for example, be done by subjecting the motion fields determined in step S5 to a thresholding operation. Thus, in other words, in step S6, for each slice, i.e. for each low resolution 3D image, an optimum point of time with a minimal motion in the respective area of the heart is determined.

Then, in the subsequent step S7, a list of time points/time periods is determined, at which the respective areas of the heart have minimal motion or are at rest. The missing time points may be determined by interpolation. Then, in the subsequent step S8, a high resolution image having full resolution is reconstructed using the optimal phase points according to the high resolution list for each region of the heart. This may, for example, be done as described in W. Kalender, "Computed Tomography: Fundamentals, System Technology, Image Quality, Applications" Publics MCD Verlag, Munich, 2000, which is hereby incorporated by reference. Then, the method continues to step S9, where it ends.

According to the above described method, the high resolution image may be determined from data determined at different points in time and at different phase points, since, for each region of the object, the optimal phase point/time point is used. Thus, advantageously, an improved image quality may be provided, where, for example, the whole heart may be reconstructed without blurring. Furthermore, according to the present invention, the optimal phase point for the respective regions of the heart are selected automatically. Furthermore, since the motion detection operates on low resolution images, the additional computational costs involved for detecting the optimal time/phase points are kept moderate. Thus, a highly efficient method is provided, allowing for an improved image quality. As mentioned above, the method may be implemented as a computer program and may be stored on a computer product such as a CD-ROM. However, the computer program may also be available from a network, such as the World Wide Web.

SECOND EXEMPLARY EMBODIMENT

The second exemplary embodiment of the present invention will be described with respect to coronary artery imaging in multi-slice CT. Multi-slice CT (MSCT) has great potential for becoming the modality of choice for a non-invasive diagnosis of coronary artery disease (CAD). As described with reference to FIG. 1, the CT data are acquired along with an ECG signal or a PPG signal. As may also be seen from the first exemplary embodiment, it is beneficial to adapt the reconstruction, i.e. the time window within the ECG signal/cardiac cycle, from which data are used for reconstruction for optimum image quality. The reason for the need for such adaptation is that for each of the coronary arteries, there is a different motion pattern throughout the cardiac cycle, i.e. each vessel (and potentially even each part of each vessel) has its own individual point in time or phase point where its speed of motion is maximal or minimal. This means that for a diagnostic inspection of each (part of a) vessel, the reconstruction window or gating window may be shifted to the minimum motion (rest) phase for this vessel section of interest, in order to achieve image quality.

According to this second exemplary embodiment of the present invention, a motion field is determined, describing the motion of the respective object of interest, i.e. the vessels between time frames. Time points or phase points are determined from the motion field at which the respective portions of the vessels are at rest or have minimum motion and then, an automatic or user-interactive optimization approach may be performed by centering the reconstruction image at such time points and performing the reconstruction of the image at these time points. This will be described in further detail with reference to FIG. 3.

Figure 3:
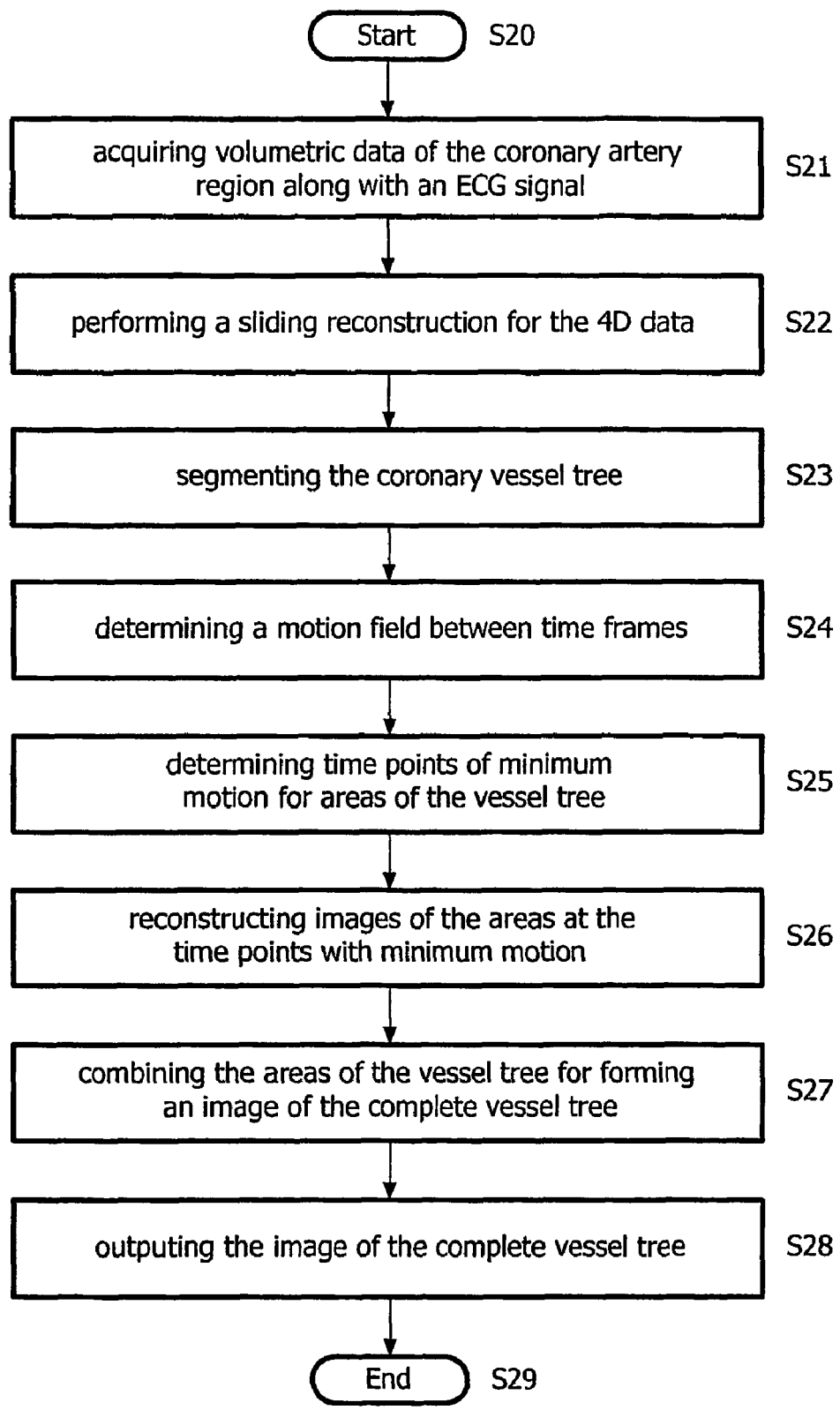
FIG. 3 is a flow-chart of a second exemplary embodiment of a method of operating the device of FIG. 1

FIG. 3 is a flow-chart of a second exemplary embodiment of the method for operating the image processing device 2 depicted in FIG. 1 according to the present invention.

After the start in step S20, the method continues to step S21, where volumetric data of the coronary artery region measured along with an ECG signal or a PPG signal are acquired. The volumetric data along with the ECG signal or the PPG signal form 4D data. Then, in the subsequent step S22, a sliding reconstruction is performed for the 4D data. This may, for example, be done by using a retrospective or prospective ECG triggering and a standard reconstruction window, which is shifted along the R-R time interval. This provides for a sequence of 3D reconstructions, which may, for example, be displayed as a 3D movie via the display of the input/output unit 4 to an operator or user. Then, in the subsequent step S23, from these 3D reconstructions or images, the coronary vessel tree is segmented. This may, for example, be done by a region growing approach, starting from the aorta. By this, the coronary vessel tree is segmented as far as possible. Then, in the subsequent step S24, motion fields between the time frames, i.e. between the 3D reconstructions, are determined. Instead of the determination of motion fields, including a direction of the motion, it may be sufficient to determine an absolute value of the motion or a magnitude of the motion. The motion fields may, for example, be determined by using image registration approaches, such as, for example, template matching. From the motion fields, the local vessel velocity can be determined as a function of time for the fraction of the R-R interval, during which the radiation (the x-ray source 16) was on. In other words, for each part of the vessel, defined by a suitable neighborhood, suitable for diagnostic purposes, the time point of minimum motion is determined in step S25. Then, the reconstruction window used in the subsequent reconstruction is centered at that time point and the reconstruction is performed in step S26. Then, in the subsequent step S27, the areas of the vessel tree for which reconstruction was performed on data from different points in time, are combined for forming the image of the complete vessel tree.

In rare cases, it may appear that the adjacent vessel parts do not fit geometrically well enough together for curved reformat representation of the total vessel. This may happen due to the fact that adjacent vessel parts may have been determined from data measured at different points in time. In such rare cases, according to an aspect of the present invention, measures for smoothing the representation may be performed. Then, the method continues to step S28, where the image of the complete vessel tree is output to, for example, the user or operator via the display of the input/output unit 4 and then the method continues to step S29, where it ends.

Advantageously, this method allows for an automatic optimization of the coronary image quality.

According to an aspect of this second exemplary embodiment of the present invention, the reconstruction performed in step S26 may be automatically repeated for varying widths of the window. Then, from the results, the sharpest or crispest image may be determined or stored for later retrieval during, for example, a diagnostic inspection phase.

In a variant of this exemplary embodiment of the present invention, steps S23 and S24 may be omitted.

THIRD EXEMPLARY EMBODIMENT

As in the case of the second exemplary embodiment of the present invention, the third exemplary embodiment of the present invention will also be described with reference to a coronary artery imaging in MSCT.

Figure 4:
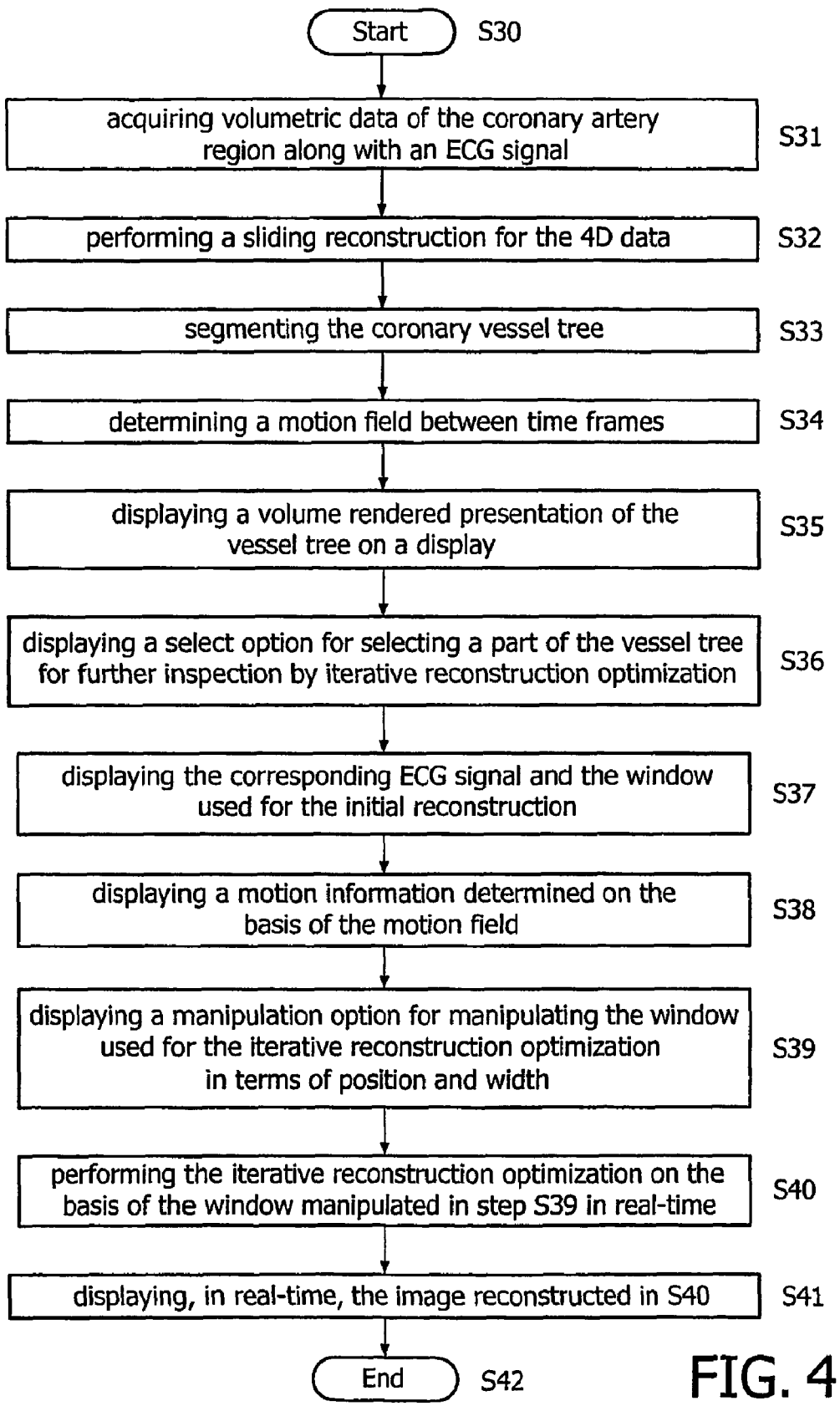
FIG. 4 is a flow-chart of a third exemplary embodiment of a method of operating the device of FIG. 1.

FIG. 4 is a flow-chart of the third exemplary embodiment of the method for operating the image processing device 2 depicted in FIG. 1, according to the present invention.

Since steps S30 to S34 correspond to steps S20 to S24 as described with reference to FIG. 3, for a detailed discussion and description of steps S30 to S34 reference is made to steps S20 to S24 in FIG. 3, to avoid unnecessary repetition. As in FIG. 3, in a variant of this exemplary embodiment, steps S23 and S24 may be omitted.

After step S34, the method continues to step S35, where the volume rendered representation of the vessel tree determined in step S34 is displayed to a user or operator on the display of the input/output unit 4. Then, a select option is displayed on display of the input/output unit 4 to a user or operator for selecting a part of the vessel tree for further inspection by iterative reconstruction optimization. In other words, a select option is presented to the user via the display of the input/output unit 4, such that the user or operator may select a part of the vessel tree for which a more detailed image should be determined. Then, the method continues to step S37, where the corresponding ECG signal or PPG signal and the window used for the initial iterative reconstruction optimization are displayed on the display of the input/output unit 4 to the user or operator. Furthermore, as indicated in step S38, a motion information determined on the basis of the motion field may be displayed to the user or operator via display of the input/output unit 4.

Then, in the subsequent step S39, a manipulation option is displayed to the user or operator, prompting the user or operator to manipulate the reconstruction window or gating window used for the iterative reconstruction optimization. The manipulation may include a variation of the position and/or the width of the reconstruction window. Then, after reading the input by the user, which the user may input to the image processing device 2 via a suitable keyboard or touch-screen of the input/output unit 4, the method continues to step S40, where the iterative reconstruction optimization is performed on the basis of the window manipulated in step S39. This iterative reconstruction optimization is performed in real-time. Then, in the subsequent step S41, the image reconstructed in step S40 is displayed on the display of the input/output unit 4. Thus, according to this exemplary embodiment of the present invention, the user may manipulate the reconstruction window in terms of position and width, using, for example, standard level and window mechanisms. Then, the reconstruction result is immediately updated, i.e. a new image is determined by performing the iterative reconstruction optimization with the new window, such that the operator may interactively control the optimization process.

Then, the method continues to step S42, where it ends.

According to a variant of this third exemplary embodiment of the present invention, the individual results together with, for example, the respectively used reconstruction window may be displayed so that the user may compare the results obtained for different reconstruction window settings.

Thus, according to this exemplary embodiment of the present invention, a real-time interactive optimization procedure may be provided, allowing for an optimum image quality, in particular if applied to the coronary vessels in MSCT.

With reference to FIGS. 1 to 4, the present invention has been described by using exemplary embodiments. Individual features and method steps of the three embodiments described above may be combined and used and applied in combination with each other.

As noted above, the motion fields may be determined as described in T. Schäffter et al., "Motion compensated projection reconstruction" Magn. Reson. Imaging, 41:954-963, 1999. As discussed in the subject reference, motion during the acquisition of data degrades the image quality by introducing artifacts. In radial acquisition schemes, motion leads to blurring. If the acquisition of one data subset is fast with respect to the motion, all objects in the excited slice can be regarded as fixed during the acquisition of one data subset and motion occurs only between the acquisition of successive subsets. In reality this assumption is only approximately fulfilled, so that motion during the acquisition of a subset still causes a residual blurring of the sub-image, which reflects the mean motion state of the acquisition period. A high-resolution image is the sum of the subset images, with each subset image representing a different motion state. Simply adding these subset images would lead to a superposition of the different motion states, and can thus to blurring artifacts. Motion can be estimated from the sequence of low-resolution images, and can then be compensated before the sub-images are combined into a high-resolution image.

The measurement of projections is the simplest form of a navigator that allows detection of translations. Recently the use of more sophisticated navigators has been proposed. The acquisition of a number of different projections can be used to detect more complex motion. For example, the motion of two rigid bodies that move in different directions can be detected by two orthogonal projections. If the motion becomes more complex, other methods are adequate. The interleaved radial acquisition scheme allows reconstructing low-resolution images from each data subset. Assuming that each subset corresponds to one motion state, motion can be estimated using the low resolution images. To that end, so called block-matching techniques are applied. These techniques are based on the assumption of "optical flow" i.e. brightness changes in an image are caused only by the object's movement. Following this principal, motion is estimated by optimally matching the gray value patterns of rectangular regions of interest, "the blocks", between two images, and the mutual displacement of the block center is assigned to the motion estimate. The methods most widely used for estimating the block similarity are based on gray value differences, e.g. mean squared differences, or on gray value correlation. The cross correlation function can be used to identify the most similar block positions because it allows a better definition of the similarity maximum in comparison with difference-based measures. The latter, however, allow for more precise location of the optimal block positions. The difference in the respective block positions directly give the displacement d(x) if the imaged object part.

A number of block matching algorithms have been proposed that use different search strategies. The computational cost of the algorithms depends strongly on the size of the blocks and the search area. In the simplest form, only displacements within the search area can be detected. The computational cost for a full search grows with the square of the size of the size of the search area. This makes a full search slow when large displacements are to be detected. The performance of the block matching algorithm can be involved by use of a hierarchical approach. Whenever movements of structures results in spatially smooth displacement fields, these can be reliably estimated even under unfavorable signal-to-noise conditions by hierarchical block matching using sets of images of increasing spatial resolution. Starting from the lowest-resolution level, motion estimates are progressively refined by taking the displacement obtained at one level as the starting position for a local optimization at the next finer level that gives a more accurate update. This bottom-up-refinement ends at the original resolution level and provides a full-resolution displacement estimate. This approach is very fast, due to the reduction in geometric scale, it only involves small search areas and block sizes for detecting even large displacements. The search range of a hierarchical block matching algorithm using a search range SR on each of the L levels is approximately given by $$SR_{HR} = SR \cdot 2^{L-1} \qquad \text{Equation 1}$$

due to the fact that the largest displacements should be determined on the lowest resolution level and the search on the intermediate and on the original resolution level are used for correction and refinement, only. The use of different resolution makes the hierarchical search very efficient. For a lower resolution level the number of blocks is decreased by a factor of 4 by interpolation in both image dimensions. Assuming that identical search strategies are applied to all resolution levels, i.e. the block size search ranges and the block overlaps are identical, the overall complexity of a hierarchical search can be estimated as:

$$Comp(HR) = SR^2 * \sum_{l=0}^{L-1} \left(\frac{1}{4}\right)^l * Comp(SIM)$$

Equation 2 where Comp(Sim) denotes the complexity of the similarity measures for a given block size. The number of resolution levels L and the search range SR depends on the length of the largest displacement vector that has to be detected.

The hierarchical search produces smooth displacement fields reflecting true physical movements. It is robust against noise and motion artifacts since only the largest and best-defined object structures survive on the lowest resolution level where the estimation starts. The displacement vectors determined on the low-resolution scale are replicated to provide a displacement field for the search on the next scale. The replication of the displacement vectors inside one block can lead to vectors in noisy background that are not related to real motion. However, no problems will arise from this fact because only blocks containing noise are matched against each other and thus only the noise structure would change locally.

The accuracy of the hierarchical block matching algorithm can be further improved by the use of strongly overlapping blocks. The distance between the block-centers is then smaller than the block sizes. However, the limit of this idea is to perform block matching for each pixel. The motion estimation technique has been applied to the acquired sub-images as described in the previous sections. Motion is estimated with respect to the second subset used as a reference state of motion. However, the reference frame can be chosen arbitrarily, and motion can be estimated with respect to each of the four motion states. After determining all displacement fields $\vec{d}_i(\vec{x})$, the reconstruction of the high-resolution image according to can simply be modified to compensate for motion:

$$I_{MC}^{HH}(\vec{x}) = \sum_i BP(\{p_\theta(\vec{u}_\theta * (\vec{x} + \vec{d}_i(\vec{x})))\}_i)$$

Equation 3

$\vec{u}_\theta = (\cos\theta, \sin\theta)$.

In this equation, a back-projection is applied to the filtered projection $p_\theta$ of the ith subset taking the displacement $\vec{d}_i(\vec{x})$ of each pixel with respect to one reference frame into account i.e. the back-projection is calculated at the position $\vec{x} + \vec{d}_i(\vec{x})$. The motion compensated (MC) high-resolution image $I_{MC}^{HH}(\vec{x})$ represents the motion state with respect to one reference frame. As described above, the reference frame can be chosen arbitrarily and for each subset a high-resolution MC-image can be reconstructed using different sets of displacement fields. Thus the MC images show different motion states with high spatial resolution.

According to Equation 3, an MC-image is reconstructed using displacement fields that are estimated from sup-images, i.e. images reconstructed from one single data subset. The accuracy of the motion estimation is thus limited by the resolution of the sub-images. In the following, a reconstruction will be described that improves the accuracy of the motion compensation. The basic idea of this technique is reconstruct MC images on an intermediate resolution level that can subsequently be used for more accurate estimate the motion estimation. According to Equation 3, the reconstruction of image on different resolution levels R is described by:

$$I_{MC}^R(\vec{x}) = \sum_i^{N^R} BP(\{p_\theta(\vec{u}_\theta * (\vec{x} + \vec{d}_i^R(\vec{x})))\}_i)$$

Equation 4

$\vec{u}_\theta = (\cos\theta, \sin\theta)$.

The Number $N^R$ of the data subsets $\{p_\theta(\vec{u}_\theta * (\vec{x} + d_i^R(\vec{x})))\}_i$ needed to reconstruct an MC image $I_{MC}^R(\vec{x})$ increases with the resolution level R, the displacement $\vec{d}_i^R(\vec{x})$ of each pixel is determined by a motion estimation using images $I_{MC}^{R-1}(\vec{x})$ with lower resolution. In case of acquiring four data subsets MC-images at three resolution levels can be reconstructed as follows: 1) motion estimation is preformed on images reconstructed from the original data subsets with respect to one reference state, e.g. the images have a numerical resolution of $64^2$; 2) the estimated motion fields are used to reconstruct an MC-image with a higher intermediate resolution by combining the data of two subsets, e.g. the image has a numerical resolution of $128^2$; 3) step 1 and 2 are repeated to reconstruct MC-images with a higher resolution for each motion state e.g. the images have a numerical resolution of $128^2$; 4) motion estimation is preformed on the MC-images obtained in step 3, and a hierarchical motion estimation with two levels is applied by refining the motion fields achieved in step 1; and 5) the estimated motion field derived from the MC-images is then used to reconstruct MC-images at the highest resolution level where four subsets have to be combined, e.g. the image has a numerical resolution of $256^2$. Due to the fact that the described reconstruction technique generates MC-images of different resolution levels, it can be considered as hierarchical reconstruction improving the accuracy of the motion estimation.

What is claimed is:

1. A method for reconstructing computer tomography (CT) images, comprising:
   determining motion fields indicative of inter-image motion for a single heart cycle;
   identifying where the inter-image motion is minimal based on the motion fields; and
   reconstructing an image from projection data corresponding to the identified minimal inter-image motion.

2. The method of claim 1, further comprising: receiving concurrently acquired CT data and an electrocardiogram (ECG) signal, wherein the motion fields are determined based on the ECG signal.

3. The method of claim 2, further comprising: determining a beginning and an ending of the single heart cycle based on the ECG signal.

4. The method of claim 3, wherein the motion fields are determined based on the beginning and the ending of the single heart cycle.

5. The method of claim 1, further comprising: identifying a cardiac region of interest, wherein reconstructing the image reconstructs projection data corresponding to the cardiac region of interest.

6. The method of claim 5, wherein identifying the cardiac region of interest comprises identifying at least a sub-portion of the coronary artery.

7. The method of claim 1, wherein a motion field is indicative of a magnitude of a difference between volume regions in two templates.

8. The method of claim 1, wherein the motion fields describe motion of the heart for the single heart cycle.

9. The method of claim 1, further comprising: determining time periods at which heart motion is minimal for the single heart cycle based on the motion fields.

10. The method of claim 9, wherein determining the time periods includes subjecting the motion fields to a thresholding operation.

11. The method of claim 9, further comprising: deriving missing time periods through interpolation.

12. The method of claim 9, further comprising: identifying a list of time periods, from the determined time periods, at which heart motion is minimal.

13. The method of claim 12, wherein the projection data reconstructed to generate the image corresponds to the identified list of time periods.

14. A system for reconstructing computer tomography (CT) images, comprising:
   a first component that determines motion fields indicative of inter-image motion for a single heart cycle;
   a second component that identifies where the inter-image motion is minimal based on the motion fields; and
   a third component that reconstructs an image from projection data corresponding to the identified minimal inter-image motion.

15. The system of claim 14, wherein the first component determiners the motion fields based on CT projection data for the hear cycle and a concurrently acquired ECG signal.

16. The system of claim 15, wherein the first component determiners the motion fields based on a beginning and an ending of the single heart cycle.

17. The system of claim 14, wherein the image is indicative of a cardiac region of interest.

18. The system of claim 14, wherein the image is indicative of a sub-portion of the coronary artery.

19. The system of claim 14, wherein the second component identifies time periods at which heart motion is minimal based on the motion fields, and the projection data corresponds to the identified time periods.

20. A method, comprising:
   determining motion fields indicative of differences between reconstructed volumetric images reconstructed with volumetric CT data from a same heart cycle;
   determining where motion is minimal based on the motion fields;
   selecting a sub-portion of the volumetric CT data that corresponds to where the motion is determined to be minimal; and
   reconstructing an image from the selected portion of the volumetric CT data.

* * * * *